United States Patent [19]

Greenberg

[11] 3,996,348

[45] Dec. 7, 1976

[54] INSECT-COMBATTING DEVICE

[75] Inventor: Jack Greenberg, Richmond, Va.

[73] Assignee: A. H. Robins Company, Incorporated, Richmond, Va.

[22] Filed: Oct. 31, 1975

[21] Appl. No.: 627,671

Related U.S. Application Data

[63] Continuation-in-part of Ser. No. 417,704, Nov. 20, 1973, Pat. No. 3,918,407.

[52] U.S. Cl. .............................. 424/78; 424/225; 43/131
[51] Int. Cl. .................. A01n 9/36; A01n 17/00
[58] Field of Search ............ 43/129, 131; 119/160, 119/106; 424/219, 225, 78

[56] References Cited

UNITED STATES PATENTS

| | | | |
|---|---|---|---|
| 2,971,882 | 2/1961 | Ospenson et al. | 424/225 |
| 3,882,226 | 5/1975 | Bradburne | 424/219 |
| 3,882,227 | 5/1975 | Bradburne | 424/219 |

*Primary Examiner*—Hugh R. Chamblee

[57] ABSTRACT

An improved insect-combatting device (e.g., for use against houseflies, gnats and mosquitoes) is disclosed. The device comprises a shaped solid body having a porous surface capable of gradually and continually releasing naled insecticide in an amount sufficient to provide an insecticidally active concentration of said naled over a prolonged period of time and comprises a synthetic resinous matrix material, from about 15 to about 35 weight percent of naled and a minor amount effective to retard spewing of the insecticide of finely divided silica particles and at least one $C_{14}$ to $C_{20}$ saturated aliphatic carboxylic acid or a salt or ester thereof. The device is formed from a mixture of the said synthetic resin, naled, finely divided silica particles, $C_{14}$ to $C_{20}$ to aliphatic saturated carboxylic acid or salt or ester thereof and a surface porosity control component that is non-reactive in the mixture and has a boiling point at or below the curing temperature to produce surface openings in communication with pores in said body by vaporization of said porosity control component to provide the release of naled gas at a rate effective to control insects in the vicinity of said body, but insufficient to form as spew on the body.

11 Claims, 1 Drawing Figure

U.S. Patent  Dec. 7, 1976  3,996,348
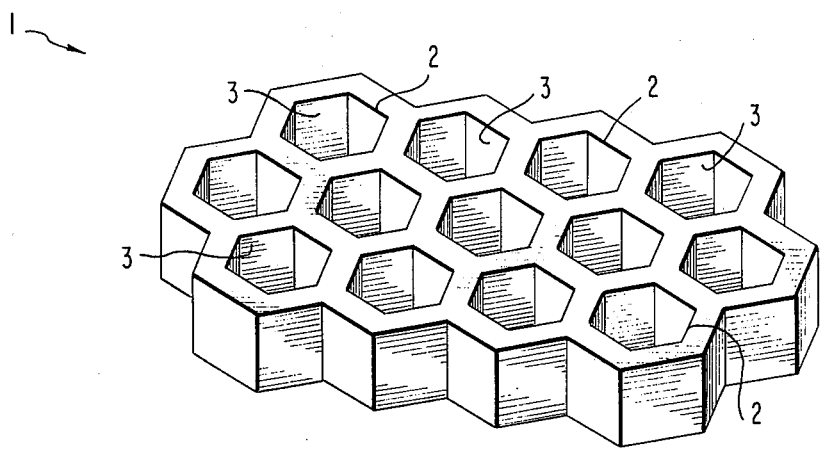

INSECT-COMBATTING DEVICE

CROSS-REFERENCE TO RELATED APPLICATIONS

This application is a continuation-in-part application of U.S. Patent application Ser. No. 417,704, filed Nov. 20, 1973, now U.S. Pat. No. 3,918,407.

BACKGROUND OF THE INVENTION

This invention relates to the control of insects such as common houseflies (*Musca domestica*), fruit flies (*Drosophila melanogaster*), mosquitoes (*Culex pipiens*) and other similar insects in the vicinity of an insecticide-containing device.

Heretofore, insect-combatting devices, such as pest strips and the like, comprised of a PVC resin having a dispersion of the insecticide dimethyl 2,2-di-chlorovinyl phosphate, commonly known as DDVP or by its trademark Vapona, have been widely used for the purpose of controlling flying insects such as houseflies, mosquitoes and the like in the vicinity of the device. However, DDVP has been reported to have an objectionable depressing effect on the plasma and red cell cholinesterase at least in animals which effect is particularly acute at high concentrations which are produced during the first few days after a pest strip has first been exposed to the atmosphere. This is believed due to the fact that the liberation rate of DDVP from presently available DDVP-containing pest strips is not uniform but rather is higher during the first few days after activation, i.e., removal of the pest strip from the packing and exposing it to the atmosphere. There are also indications that DDVP may be harmful to humans. Pest strips containing DDVP have been banned in Holland. Moreover, the aforementioned initial high liberation rate represents an unduly rapid loss of insecticide and creates an upper limit on the period that DDVP is liberated at a rate sufficient to effectively control pests. DDVP also has been found to possess a high degree of residual toxicity in the area of the device, apparently from adsorption of the DDVP vapors in walls, floors, ceilings, curtains, rugs, and the like. Even after a DDVP-containing pest strip is removed from a room environment, residual DDVP vapors can often be detected for several days thereafter.

It has also been suggested to utilize other insecticides such as naled (1,2-dibromo-2,2-dichloroethyl dimethyl phosphate) in an insect-combatting device such as a pest strip. The preparation of naled is described in U.S. Pat. No. 2,971,882 to Osmonson et al. PVC resin-naled combinations have been proposed for use as an insecticide of a general nature in French Pat. No. 1,568,198, issued Apr. 14, 1969, and in U.S. patent application Ser. No. 85,445, filed Jan. 30, 1961 (abandoned, but accessible to the public), and corresponding British Pat. No. 955,350. Netherlands published application No. 6,610,279 discloses fly strips composed of PVC-naled as well as PVC-DDVP combinations which are stated to have such high insecticide release rates as to require an outer laminate layer to retard the insecticide release. U.S. Pat. No. 3,344,021 discloses PVC-naled combinations for use as an anthelmintic composition.

A number of problems have been encountered in providing a commercially satisfactory PVC-naled combination for use in an insect-combatting device. First, there must be a sufficient amount of naled released to provide effective control of the insects in the vicinity of the device. Contrary to statements in the prior art disclosures, it has been found that release rates for naled are very much less than the release rates for DDVP. Naled has a low vapor pressure of about $2 \times 10^{-4}$ mm. Hg. at 20° C. as compares to that for DDVP of $1.2 \times 10^{-2}$ to be thus only about 1.7% of the vapor pressure of DDVP.

It has further been found that the inclusion of an insecticide such as naled in a synthetic resin matrix in amounts sufficient to control insects for a commercially acceptable time leads to exudation of liquid insecticide (or "spew") on the surface of the device. These liquid droplets pose serious environmental and aesthetic problems as well as significantly decreasing the effective life of the device.

A further unexpected problem found with a PVC-naled composition was the tendency of the resin to decompose during the shaping process. For example, unsatisfactory results were obtained in early tests where naled was substituted for DDVP in PVC combinations employed in extrusion apparatus used for making PVC-DDVP pet collars known in the art. Burning and charring of the extrudate were found to occur during curing of the collars, and the finished collar underwent an unexplainable reduction in the naled concentration as compared with the naled concentration in the original mixture.

OBJECTS AND SUMMARY OF THE INVENTION

It is an object of this invention to provide an insect-combatting device and method of using said device which alleviates or avoids the problems of the prior art.

A further object of this invention is to provide an insect-combatting device which may contain a relatively high loading of insecticide without objectionable liquid insecticide droplet formation on the surface of the device and a method of using such device.

It is also an object of this invention to provide an insect-combatting device which is capable of combatting insects in the vicinity of the device by prolonged release of insecticide while minimizing undesired adsorption of the insecticide into contiguous solid objects and a method of using said device.

A further object of the invention is to provide a method of combatting insects by making a body of synthetic resin containing between about 15% and 35% of naled through the use of a volatile additive which is released during the curing step to produce a texture including porous surface openings which allow for an unexpectedly large increase in the release of naled gas at a rate effective to control insects to thus provide a naled-containing device which has a commercially practical effective life.

In one aspect, the present invention provides a device for combatting insects comprising a shaped solid body having a porous surface capable of gradually and continually releasing naled insecticide in an amount sufficient to provide an insecticidally active concentration of said naled over a prolonged period of time, said device comprising a synthetic resinous matrix material, from about 15 to about 35 weight percent of naled and a minor amount effective to retard spewing of the insecticide of finely divided silica and at least one $C_{14}$ to $C_{20}$ saturated aliphatic carboxylic acid or a salt or ester thereof, said device being formed from a mixture of said synthetic resin, naled, finely divided silica particles, $C_{14}$ to $C_{20}$ aliphatic saturated carboxylic acid or salt or ester thereof and a surface porosity control component that is non-reactive in the mixture and has a boiling point at or below the curing temperature to produce surface openings in communication with pores in said body by vaporization of said porosity control component to provide for release of naled gas at a rate effective to control insects in the vicinity of said body, but insufficient to form as spew on the body.

In another aspect, the present invention provides a device for combatting insects, said device comprising: a discrete body of flexible synthetic resin material containing between about 20 and 30 weight percent naled and a spew retarding amount of from about 15 to about 25 weight percent of finely divided silica particles and from about 0.5 to about 1.5 weight percent of at least one $C_{14}$ to $C_{20}$ saturated aliphatic carboxylic acid or a salt or ester thereof; said discrete body being formed from a mixture of said synthetic resin, naled, finely divided silica particles and from about 1 to about 3 weight percent of a surface porosity control component that is non-reactive in the mixture and has a boiling point at or below the curing temperature of said resin, said mixture being heated to its curing temperature to produce surface openings in communication with pores in said body by vaporization of said porosity control component to provide for release of naled gas at a rate effective to control insects in the vicinity of said body, but insufficient to form as droplets on the body.

In still another aspect of the present invention, there is provided a method of controlling insects which comprises:

providing a discrete body comprising a mixture of a synthetic resin, from between about 15 to 35% by weight of said strip of naled and a spew retarding amount of finely divided silica particles and at least one $C_{14}$ to $C_{20}$ saturated aliphatic carboxylic acid or a salt or ester thereof;

said body being formed from a mixture of said synthetic resin, naled, silica particles, saturated aliphatic carboxylic acid and a minor amount of a surface porosity control agent that is non-reactive in the mixture and has a boiling point at or below the curing temperature of said mixture, which is formed into said body at the curing temperature to vaporize said control agent and produce surface porosity in said body to provide for release of naled at a rate to effectively control insects in the vicinity of said body but insufficient to form as droplets on the body; and placing and maintaining said body in an areq in which said insects are to be controlled.

BRIEF DESCRIPTION OF THE DRAWING

The FIGURE is a schematicc representation of a preferred embodiment of the insect-combatting device of the present invention.

DESCRIPTION OF THE PREFERRED EMBODIMENTS

Referring now to the drawings, FIG. 1 shows a typical device adapted for combatting insects. As shown therein, such a device can be in the form of a shaped body 1 having a regular, symmetrical matrix of cavities generally indicated as 2 which extend throughout one dimension of the body. The cavities have substantially parallel axes and walls 3 that define an essentially straight line along one dimension. In this fashion, the shaped device has good dimensional stability and ease of manufacture as well as a relatively high surface area from which the insecticide is released. It will be understood to those skilled in the art that other shapes may also be utilized.

The components making up a satisfactory insecticide-containing insect-combatting device include a synthetic resin that is compatible with the relatively high amounts of insecticide and a strength sufficient to maintain the integrity of the shaped device throughout the period during which the insecticide is released in amounts effective to combat insects, e.g., flies or mosquitoes. The shaped insect-combatting device includes the synthetic resin in a concentration sufficiently large to give the device physical properties such as strength, flexibility, and freedom from tackiness so as to make it suitable for use as an insect-combatting device. Generally, the shaped device contains from about 20 to about 80, preferably from about 25 to about 50, weight percent of the synthetic resin.

The various known synthetic resins which can be used in the insect-combatting device include materials such as polyethylene, polypropylene, copolymers of ethylene and propylene, nylon, cellophane, polyacryltes, such as polymers and copolymers of methylacrylate, ethylacrylate, methylmethacrylate and ethylmethacrylate; polymers of vinyl compounds, such as polystyrene, polymerized divinylbenzene; polyvinyl halogenides, such as polyvinylchloride; polyvinyacetals, such as polyvinylbutyral; polyvinylidene compounds, such as polyvinylidenechloride; polyvinylacetate; ethylvinylacetate-vinylacetate copolymers; copolymers of vinylchlorde and vinylacetate; polyurethanes, polyaldehydes; and ethermoplastics.

Polyvinylchloride (PVC) homopolymers and copolymers with other polymers such as polyvinyl acetate (PVA) are preferred synthetic resin materials. Suitable PVC resins are commercially available and include, for example, PVC homopolymer dispersion resin Diamond PVC-7502$^{TM}$ and PVC homopolymer extender resin Diamond PVC-7-446$^{TM}$, both available from The Diamond Sharock Co., and mixtures thereof. Other suitable, commercially available PVC resins are known in the art. Suitable PVC-PVA copolymers are also commercially available and include, for example, Geon 135 (Goodrich Corp.), PVC-74 (Diamond Alkali Co.) and XR-6338 (Exxon-Firestone). Other PVC-PVA copolymers are also known in the art.

The improved insect-combatting device of the present invention contains naled (1,2-dibromo-2,2-dichloroethyl dimethyl phosphate) insecticide in an amount sufficient to provide an insecticidally active concentration of the insecticide over a prolonged period of time (e.g., about 120 days or longer), which amount can be from about 15 to about 35, preferably from about 20 to about 30, weight percent insecticide. With insecticide concentrations in these ranges, the insect-combatting device releases from about 1.5 to about 5 milligrams of insecticide per inch of surface area per day. Although the insect-combatting device of the present invention may be utilized in any environment containing the insects, maximum efficiency may be obtained when the device is utilized in a confined space including these insects.

Generally, the utilization of naled insecticide in amounts of from about 15 to about 35 weight percent in a synthetic resin matrix leads to liquid naled droplet or "spew" formation on the surface of the insect-combatting device. Liquid droplets of naled insecticide forming on the surface of the shaped device pose a substantial health and safety hazard as well as dimiished insecticidal efficiency. The insect-combatting device of the present invention includes a minor amount effective to retard spewing of the insecticide of finely divided silica particles and at least one $C_{14}$ to $C_{20}$ saturated aliphatic carboxylic acid or a salt or ester thereof and exhibits a substantially lessened tendency towards formation of liquid droplets of naled insecticide on its surfaces.

Although silica is known in the art, along with a number of other minerals and glasses, as a filler for various synthetic resins, it has unexpectedly been found that finely divided silica particles generally having a particle size of from about 1 to about 50, preferably from about 2 to about 10, microns, exhibit a high degree of relative efficiency in retarding insecticide spewing when utilized in sufficient amounts, which spew-retarding amounts are generally in the range of from about 10 to about 35, preferably from about 15 to about 25, weight percent of the insect-combatting device. It has been found that utilization of finely divided silica particles in an amount of less than about 10 percent by weight is generally ineffective to provide any significant retardation of the insecticide spew while utilization of finely divided silica particles in an amount above about 35 percent by weight does not result in any further reduction in spew formation.

While the addition of the finely divided silica particles exhibit a high degree of relative efficiency in retarding naled insecticide spewing, a small amount of the naled insecticide may nonetheless sometimes exude from the insecticide-containing device. It has further been found that the inclusion in the device of a minor amount of at least one $C_{14}$ to $C_{20}$ saturated aliphatic carboxylic acid or a salt or ester (e.g., magnesium stearate) thereof, is effective to essentially retard any naled insecticide spewing which might otherwise occur. The $C_{14}$ to $C_{20}$ saturated aliphatic carboxylic acid, which can be a mixture of such acids, is generally utilized in an amount of from about 0.25 to about 3, preferably from about 0.5 to about 1.5 weight percent in the device. Stearic acid and palmitic acid are preferred.

While East German Pat. No. 91,898 discloses the addition of a $C_{14}$ to $C_{20}$ saturated aliphatic carboxylic acid along with a particular mixture of primary and secondary plasticizers to a polyvinyl chloride-DDVP mixture, the acid-plasticizers mixture being added to retard spewing of the DDVP, it has been found that the utilization of the $C_{14}$ to $C_{20}$ saturated aliphatic carboxylic acid alone (i.e., without the finely divided silica particles) with the resin and insecticide in the insect-combatting device of the present invention is insufficient to effectively retard spewing of the naled insecticide from the device. Similarly, the use of the finely divided silica particles alone (i.e., without the $C_{14}$ to $C_{20}$ saturated aliphatic carboxylic acid) is insufficient to effectively retard spewing of the insecticide from the device. However, the utilization of a minor amount of both the finely divided silica particles and the $C_{14}$ to $C_{20}$ saturated aliphatic carboxylic acid has been found to possess a high efficiency for insecticide spew retardation and to effectively maintain the surface of the device free of liquid droplets of the insecticide.

It has been ascertained that when the release rate falls off to about 0.4 to about 0.6 milligrams of naled per square inch of surface area per day, that the effectiveness of the device for insect control has been reduced to the point where it should be replaced. Utilization of naled in the device in amounts less than about 20 weight percent results in the release rate reaching an ineffective level in an unsatisfactorily short period of time (e.g., about 90 days or less). Utilization of naled in amounts greater than about 35 weight percent results in spewing and droplet accumulation on the surface of the device.

The preparation of synthetic resin-insecticide combinations is achieved by conventional methods. Because of the compatibility of the insecticide in the resin dispersions, the compositions may be prepared merely by mechanical mixing of the pesticides with powdered resin. Dry blends, fluid pastes, or plastisol dispersions, can be made which, as is known, can be molded, extruded, cast, or otherwise formed into the shape of a band or strip. Where the prepolymerized resin exists in liquid form, as in the case of such monomers as styrene or methyl methacrylate, the insecticide may be incorporated in the liquid before it is polymerized or cured. The term "dispersion" as used herein is intended to include mixtures of a solid with a liquid, a liquid with a liquid and a solid with a solid.

In the embodiments where polyvinyl resins are used, plasticizers and other additives commonly used for providing the flexibility, strength and surface characteristics desired for an insect-combatting device are well known to those skilled in this art, and no further discussion is deemed necessary here. In addition, coloring and odor control agents may be employed in the devices of the present invention to enhance consumer acceptance.

As noted above, naled has a low vapor pressure. The naled release rate from a PVC-naled device is comparatively low and may be inadequate for a commercially acceptable insect-combatting device. The use of an additive in the mixture can be very helpful in increasing the naled release rate and makes possible both effective insect control at lower initial naled concentrations and an insect-combatting device having an increased effective life.

The additive, also referred to as a surface porosity control component, is present in the final plastisol dispersion or mix used in forming the device, and hence must be non-reactive with the other components of the dispersion or mix. The main function of the additive is to provide a surface porosity which preferably includes pores extending part way into the body of the device. The desired surface characteristics are obtained by the vaporization of the additive during the curing period. Hence the additive should comprise one or more compounds having a boiling point at or below the curing temperature of the resin.

Compounds which are suitable as the surface porosity control component in PVC resins which are cured at a temperature in the range of between about 260° to 400° F. include aldehydes and their lower alkyl acetals containing bromine or chlorine, generally having a boiling point of from about 170° to about 400°, preferably from about 185° to about 350°, F. The porosity control component may thus include one or more of the following which have approximate boiling point temperature as set forth:

| Name | B.F.° F. |
| --- | --- |
| chloroacetaldehyde | 185 |
| dichloroacetaldehyde | 192 |
| chloral | 218 |
| bromoacetaldehyde | 176–221 |
| dibromoacetaldehyde | 346 |

-continued

| Name | B.F.° F. |
| --- | --- |
| bromodichloroacetaldehyde | 258 |
| chlorodibromoacetaldehyde | 299 |
| bromochloroacetaldehyde | 233 |
| 2-bromopropanol | 229 |

The surface porosity control component is included in the synthetic resin-naled combination in an amount sufficient to produce sufficient surface porosity by its vaporization during curing of the dispersion to effectively increase the release rate of naled gas from the formed device. While the amount of the porosity control component to be used depends on the density of surface openings desired and somewhat on the particular procedure used for curing the resin, it is generally from about 0.8 to 5, preferably from about 1 to 3, weight percent of the dispersion.

The invention is additionally illustrated in connection with the following Examples which are to be considered as illustrative of the present invention. It should be understood, however, that the invention is not limited to the specific details of the Examples.

EXAMPLE I

A mixture (in parts by weight) of

| | |
|---|---|
| 30 p.b.w. | polyvinyl chloride homopolymer dispersion resin |
| 16 p.b.w. | di-2,ethylhexyl phthalate (DOP) |
| 2 p.b.w. | epoxidized octyl tallate (EPO) |
| 1 p.b.w. | bentone |
| 27 p.b.w. | naled (1,2-dibromo-2,dichloroethyl dimethyl phosphate) |
| 3 p.b.w. | bromodichloroacetaldehyde |
| 20 p.b.w. | amorphous silica particles, average particle size, 2.35 microns |
| 1 p.b.w. | palmitic acid | is thoroughly triturated to form a plastisol dispersion having a viscosity at 25° C. of 16,000 cps. as measured on a Brookfield viscometer at 20 rpm., 12,000 at 2 rpm. A portion of the plastisol is metered to a closed machined aluminum cast mold having a honeycomb-shaped cavity as in the FIGURE. Temperature of the mold at filling time, as indicated by a thermocouple immediately beneath the cavity surface is 390° F. The mold temperature is maintained at 390° F. for 2.5 minutes to maintain the dispersion at or above the curing temperature, after which the mold temperature is lowered rapidly to ambient temperature. The color of the device is brownish bronze. A strong medicinal odor emanating from the finished resin is detected.

Analysis of the device after curing and cooling shows the naled content of the collar to be 26% by weight.

The polyvinyl chloride dispersion used is commercially available from the Diamond Shamrock Company (PVC 7502) and is a high molecular weight homopolymer dispersion resin having particle size less than two microns; specific viscosity is 1.62 to 1.68 as measured in 1% solution of the resin in cyclohexane at 30° C. according to ASTM procedure.

DOP is a plasticizer for PVC and EPO is a stabilizer. The bentone is added to control the viscosity of the plastisol.

The above dispersion and extender resins are as easy to work with in producing a satisfactory device as any that have been used. However, as those skilled in this art well know, a large number of other materials, as discussed above, can be used. Naled is not known to react chemically with any synthetic resin, and considerable variations in both ingredients and proportions can be successfully used.

EXAMPLE II

The quantities and procedures of Example I are repeated except that an open-faced mold is utilized. The top side of the device is rounded due to the meniscus formed on filling the mold, the shape being retained during curing. The resulting device is brownish bronze and contains 25% naled. Apparently a small portion of the naled was lost by vaporization or by being carried off by vaporization of the surface porosity control component during curing. The same medicinal odor was present.

EXAMPLE III

The procedure of Example I is repeated using a plastisol dispersion consisting in parts by weight of:

| | |
|---|---|
| 20 | PVC homopolymer dispersion resin |
| 10 | PVC homopolymer extender resin |
| 18 | di-2-ethylhexylphthalate (DOP) |
| 2 | epoxidized cotyl tallate |
| 22 | naled (1,2-dibromo-2,2-dichloroethyl dimethyl phosphate) |
| 2 | surface porosity control component (e.g., bromodichloroacetaldehyde) |
| 25 | amorphous silica particles, average particle size - microns |
| 1 | stearic acid |

A bronze colored resin body suitable as a pest strip is obtained which analyzed 22% by weight of naled after curing and cooling. A medicinal odor was present.

EXAMPLE IV

Following the procedure of Example I and using a plastisol dispersion consisting in parts by weight of

| | |
|---|---|
| 20 | PVC homopolymer dispersion resin |
| 11 | PVC homopolymer extender resin |
| 9 | di-2-ethylhexylphthalate (DOP) |
| 2.5 | epoxized octyl tallate |
| 1 | bentone |
| 28 | naled (1,2-dibromo 2,2-dichloroethyl dimethyl phosphate |
| 2 | surface porosity control component (e.g., bromodichloroacetaldehyde) |
| 25 | amorphous silica particles, average particle size - microns |
| 1.5 | palmitic acid | a bronze colored resin body suitable for use as a pest strip is obtained after curing and cooling which analyzed 26 weight percent naled after curing and cooling. A medicinal odor was present.

EXAMPLE V

The mixture and procedure of Example I is repeated except that 30 weight percent of a technical grade of naled (1,2-dibromo-2,2-dichloroethyl dimethyl phosphate) commercially available from the Chevron Chemical Company is used. This product is known to contain certain impurities such as bromodichloroacetaldehyde, chloral, carbon tetrachloride and various forms of phosphates. These impurities constitute about 9 weight percent of the product and in large part are sufficiently volatile as to be released during the curing of the collar or shortly thereafter and hence not to interfere with the functioning of the collar.

The device formed and cured in the manner indicated in Example I is brownish bronze and contains about 26 weight percent naled.

EXAMPLE VI

A uniform mixture (in parts by weight) is made of

| | |
|---|---|
| 29.0 p.b.w. | polyvinyl chloride homopolymer general purpose resin |
| 15.3 p.b.w. | di-2,ethylhexyl phthalate (DOP) |
| 2.0 p.b.w. | epoxidized octyl tallate (EPO) |
| 25.7 p.b.w. | naled (1,2-dibromo-2,2-dichloroethyl dimethyl phosphate) |
| 3.0 p.b.w. | bromodichloroacetaldehyde |
| 20.0 p.b.w. | amorphous silica particles, average particle size 2.35 microns |
| 1.0 p.b.w. | stearic acid |
| 4.0 p.b.w. | heat-stabilizer and lubricant |

The heat stabilizer and lubricant is a mixture of 3.3 p.b.w. dibasic lead phosphate and 0.7 p.b.w. dibasic lead stearate. The mixture is fed to an injection molding machine and injection molded into the shape shown in the FIGURE at a temperature of 265° F. and a pressure of from 10,000 to 22,000 psi. The color of the device is brownish bronze and a strong medicinal odor emanating from the molded device is detected.

Analysis of the device after cooling shows the naled content to be about 25% by weight.

Naled Release Rates

The release rate of naled from compositions utilizable in this invention for a given surface area of a device of given thickness and surface area varies depending upon not only the initial naled concentration, but more importantly on whether or not the volatile additive which serves as a porosity control component has been used as discussed above. A device formed according to the present invention containing a sufficient amount for several months to control insects in the area of the device.

One significant advantage of the naled device of the present invention over the prior art DDVP device in current commercial use is found in the pattern of release of insecticide as a gas during the first few days of activation which starts at the moment of removal from a sealed container. The initial release rate of naled during the first few days in only a fraction of the initial release rate of DDVP from comparable devices due mainly to the difference in vapor pressure. For naled with porosity control additive, the release rate does not decrease noticably for a period of about 10 weeks; thereafter the release rate gradually decreases to about 50% of the maximum at the end of about 20 weeks. The pattern of the release rate curve for naled from a PVC device without the porosity control component is generally parallel. However, the total amount of naled released from a device made from a formulation containing the porosity control component is significantly higher (e.g., 10% or more) than that released from a device made from a similar formulation without the porosity control component which indicates that more naled is being released at any given time within that 20 week period for the former device than the latter device.

Comparative Example A

Following the procedure of Example II and using a plastisol dispersion consisting in parts by weight of

| | |
|---|---|
| 20 | PVC homopolymer dispersion resin |
| 12 | PVC homopolymer extender resin |
| 15 | di-2-ethylhexylphthalate |
| 2 | epoxidized octyl tallate |
| 30 | naled (1,2-dibromo-2,2-dichloroethyl dimethyl phosphate) |
| 20 | amorphous silica particles, average particle size - microns |
| 1 | stearic acid |

The cured strip contains about 25% weight naled indicating that more of the naled initially present in this dispersion was lost during the curing process than that in Example II.

EXAMPLE VII

The procedure and quantity of Example I is repeated. The resulting device having a 1 square inch surface area is designated "A". Similar devices are made according to the procedure and quantity of Example I except that 1% (by weight) stearic acid is utilized in place of the palmitic acid (device "B"), 2% (by weight) stearic acid is utilized in place of the palmitic acid (device "C"), the palmitic acid component is omitted (device "D"), the silica component is omitted (device "E") and both the silica and palmitic acid components are omitted (device "F").

Each of these devices are suspended in a 20 cubic foot cell having dimensions of 2' × 2' × 5'. The cells consisted of a framework covered on the end and three sides with a kraft-paper-foil laminate, closed on the top with plate glass to facilitate observation. The strips are suspended from the top in the middle of the cell so as not to touch the sides or bottom of the cell. The test was conducted for 16 weeks.

Visual observations of the surfaces of each device are made daily to determine the formation of liquid droplets of naled. The observations include the time at which the surface first appears "slick" or "wet" with bead or droplet formation, the first time at which run marks are observed and the time at which drops are actually formed on the bottom of the sample. These results are shown below in Table I.

TABLE I

| | Device | | | | | |
|---|---|---|---|---|---|---|
| Time for onset of: | A | B | C | D | E | F |
| First real "slick" look showing up-(no "beading") | 7-8 wks | 10 wks | 10 wks | 4-5 wks | 2 wks | 2 wks |
| Actual "beading" noticeable | 12-13 wks | 15-16 wks | 15-16 wks | 6 wks | 4 wks | 4 wks |
| Runs marks observable no dripping yet | | | | 7-8 wks | | |
| Actual drop formation | | | | | | |

TABLE I-continued

| Time for onset of: | Device | | | | | |
|---|---|---|---|---|---|---|
| | A | B | C | D | E | F |
| at bottom of sample | | | | 10 wks | | |

As may be seen from the Table, the devices which did not contain both the silica component and the $C_{14}$ to $C_{20}$ saturated aliphatic carboxylic acid component exhibit beading in relatively short times. Both Device E (acid but no silica) and Device F (which contained neither silica nor the acid) show a slick look in about 2 weeks and beading in about 4 weeks while Device D (silica but no acid) shows beading in about 6 weeks and drop formation in about 10 weeks. All of the devices of the present invention (Devices A, B and C) show beading at a considerably later time and no drop formation.

The biological activity of Devices B, C and D is measured against SRS susceptible *Musca domestica*.

25 of the SRS susceptible houseflies are added eacy day to each cell containing a device. The $LT_{50}$ valve (in minutes) is measured. As known in the art $LT_{50}$ is the time for lethal effect on 50% of the insects introduced. Table II shows the values obtained for male SRS Susceptible houseflies. Similar results are obtained also with female SRS Susceptible houseflies although the latter are generally more resistant.

TABLE II

| | $LT_{50}$ -Minutes SRS Susceptible = $LT_{50}$, minutes | | |
|---|---|---|---|
| Age of Device - Days | B | C | D |
| 1 | 50 | 51 | 48 |
| 2 | 45 | 44 | 47 |
| 13 | 55 | 54 | 55 |
| 14 | 55 | 61 | 59 |
| 21 | 53 | — | 54 |
| 23 | — | 66 | — |
| 29 | — | 57 | — |
| 30 | — | 54 | 62 |
| 34 | — | 79 | 69 |
| 37 | 48 | — | — |
| 49 | 68 | — | 62 |
| 50 | 76 | — | 66 |
| 51 | — | 77 | — |
| 55 | 86 | 83 | 81 |

The values obtained indicate that the addition of the acid component does not affect the biological activity of the devices. Similar results are obtained when the tests are repeated with CSMA (NAIDM) Susceptible *Musca domestica* and resistant strains FC, Orlando DDT and Isolan-B *Musca domestica*. The latter are pure, resistant strains of *Musca domestica* as recognized by the skilled artisan.

EXAMPLE VIII

Tests of biological activity on houseflies (*Musca domestica*), both resistant and susceptible strains and mosquitos (*Culex pipiens*) and conducted in the cell utilized in Example VI. The insects are introduced into the cell containing a device made in accordance with Example I and containing 25% by weight naled. Both the $LT_{50}$ and $LT_{95}$ are measured. The results are show below in Table III.

TABLE III

| Age, Device (days) | LT, minutes (70° F) Resistant Flies $LT_{50}$ | $LT_{95}$ | Susceptible Flies $LT_{50}$ | $LT_{95}$ | Culex pipiens $LT_{50}$ | $LT_{95}$ |
|---|---|---|---|---|---|---|
| 1 | | | 38* | 90* | 34 | 60 |
| 3 | 34* | 89* | | | | |
| 28 | | | 92 | 198 | 71 | 89 |
| 30 | 78 | 129 | | | | |
| 56 | | | 95 | 244 | 73 | 112 |
| 59 | 112 | 178 | | | | |
| 84 | | | 110 | 208 | 104 | 146 |
| 87 | 30** | 184** | | | | |
| 112 | | | 144 | 262 | 73 | 114 |
| 115 | 149 | 314 | | | | |
| 140 | | | 143 | 317 | 83 | 116 |
| 143 | 107 | 286 | | | | |

*Flies apparently weak
**Some flies of low viability

The results show that the naled-containing devices emitted the naled insecticide slowly and uniformly over a 20 week period. The devices were effective in killing both resistant and susceptible houseflies as well as the less hardy mosquitoes. Similar tests conducted with *Drosophilia melanogaster* show that these insects are also killed faster than houseflies.

Similar devices containing 25 weight percent naled are hung in the hallway of a building for 20 weeks and exposed to ambient temperatures. The percent naled remaining in the devices (average of 5 devices) is shown in Table IV.

Table IV

| Exposure Time (Weeks) | Wt. % Naled Remaining in Exposed Devices |
|---|---|
| 0 | 25.25 |
| 1 | 24.66 |
| 2 | 23.22 |
| 4 | 21.22 |
| 8 | 17.38 |
| 12 | 15.98 |
| 16 | 13.28 |
| 20 | 12.34 |

This test further shows that the devices release the naled insecticide uniformly over a prolonged period of time. Although some beading of the naled insecticide is noticed at about 16 weeks exposure, no drops or run marks are observed at the end of the 20 week test

EXAMPLE IX

Samples of various household surfaces (aluminum foil, synthetic fiber carpet, particle board, wood wood-semi-gloss enamel, vinyl wallpaper, wood-gloss enamel, vinyl flooring and tempered hardboard) are placed in a cell as utilized in Example IV and exposed for 102 days to the 25 weight percent naled-containing device of Example 6. The devices are utilized in an amount of one device per 20 cubic feet (Run G) and two devices per 20 cubic feet (Run H). Identical samples are exposed for the same time to a commercially available pest strip containing 20% by weight DDVP (dimethyl 2,2-chlorovinyl phosphate) at a rate of one device per 20 cubic feet (Run I). The adsorption of the naled or DDVP toxicant was determined by biological activity of the exposed material placed in a sealed one gallon tank in which houseflies are introduced. The $LT_{50}$ values for each is measured and the time in days for each to reach an $LT_{50}$ of 300 minutes by ventilation of the tank is estimated. The results are shown below in Table V.

Several grades of solid glass microspheres (average particle sizes ranging from about 6 to 50 microns) are also tested. All grades of solid glass microspheres exhibit relatively bad settling problems (greater with increasing particle size). In addition, devices made in accordance with Example I containing 25 weight percent naled and 45 weight percent of the solid glass microspheres exhibit a surface slickness (or sweating) after only 2 to 3 weeks. Similar samples made including 45 weight percent silica particles (in one instance, all particles through a 325 mesh sieve 95% of the particles less than 40 microns and in another instance, all through a 200 mesh sieve, 95% less than 75 microns) exhibit sweating in 5 to 6 weeks.

SUMMARY OF ADVANTAGES

The insect-combatting device of the present invention contains relatively high amounts of naled which are uniformly released over a prolonged period of time. Naled has a reduced toxicity as compared to the prior art DDVP-containing devices and shows a substantially lower tendency towards adsorption on surfaces near the device.

Table V

|  | $LT_{50}$ -Minutes | | | Estimated Days Ventilation To Reach $LT_{50}$ - 300 Min. | | |
|---|---|---|---|---|---|---|
|  | G | H | I | G | H | I |
| Aluminum Foil | No Effect | No Effect | No Effect | — | — | — |
| Carpet-Synthetic Fiber | 185 | 125 | 40 | <5> 1 | <5> 1 | 13 |
| Particle Board - Vinyl | 135 | 86 | 37 | 6 | 12 | 16 |
| Good | 104 | 76 | 38 | 5 | 15 | 20 |
| Good Semi-Gloss Enamel | 125 | 109 | 50 | 9 | 12 | 28 |
| Wall paper - Vinyl | 110 | 78 | 34 | 11 | 13 | 36 |
| Wood - Gloss Enamel | 125 | 79 | 40 | 24 | 30 | 40 |
| Vinyl Flooring | 128 | 98 | 35 | 9 | 13 | 42 |
| Tempered Hardboard | 135 | 102 | 50 | 7 | 15 | 46 |

The results show that considerably less naled is adsorbed on the surfaces than DDVP (as evidence by the much longer $LT_{50}$ times for naled). With ventilation, the naled was desorbed much faster than the DDVP. Similar tests are performed with various foods (potato, apple, bread, lettuce, tomato, orange and hamburger) with 24 hour exposure. DDVP adsorption (as compared with naled) was even higher. DDVP is adsorbed on all foods tests with $LT_{50}$ values ranging from 12 minutes (potato) to 51 minutes (hamburger) Naled at the same concentration is not adsorbed on a number of the foods tested and when adsorbed, exhibits $LT_{50}$ values ranging from 155 minutes (potato) to 380 minutes (sliced apple).

Comparative Example B

An investigation is undertaken to determine the effects of various materials on the release rates and efficacy of polyvinyl chloride formulations containing about 25 weight percent naled, about 3 weight percent of a porosity control component and minor amounts of PVC plasticizers and stabilizers.

On the basis of an initial screening, calcium carbonate (average aluminum oxide and various silicone fluids and resins are found to be unsuitable either because of their reactivity with naled or the porosity control component or because of strong incompatibility with the PVC formulations, even at relatively low loading levels of about 5 to 15 weight percent in the formulation. Several grades of powdered polyethylene and ethylene-vinyl acetate resins are also tested and determined unsuitable due to their extremely high plasticizer absorption as well as their cost.

Even though naled has been known and commercially available for a number of years prior to the present invention, and considerable research has been done with the use of naled as an insecticide, its substitution for DDVP in an insect-combatting device has not been considered feasible. Efforts to shape a collar containing naled as the insecticide were unsuccessful in the initial research, so that actual testing of the effectiveness of naled for controlling fleas was made quite difficult. In addition, naled was not considered to be a likely candidate as a substitute for DDVP since its vapor pressure is known to be less than 2% of the vapor pressure of DDVP. Moreover, the problem of spewing with naled concentrations above about 25% set upper limits on the amount of naled that can be used in an article. The device of the present invention containing the spew-retarding amounts of finely divided silica and at least one $C_{14}$ to $C_{20}$ saturated aliphatic carboxylic acid or salt or ester thereof allows the use of naled even above 25% without spew formation on the device.

By including volatile additives in the mixture used in forming the device, it has been possible to increase the naled release rate to a level which allows for the mass production of a suitable insect-combatting device.

The device in accordance with the present invention is produced to have a porous outer surface to not only release naled at a rate higher than otherwise possible and in a greater gross amount, but also to release naled at a rate effective to control insects for a substantially longer period than otherwise possible.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. A device for combatting insects comprising a shaped solid body having a porous surface capable of gradually and continually releasing naled insecticide in an amount sufficient to provide an insecticidally active concentration of said naled over a prolonged period of time, said device comprising a synthetic resinous matrix material, from about 15 to about 35 weight percent of naled and a minor amount effective to retard spewing of the insecticide of finely divided silica particles and at least one $C_{14}$ to $C_{20}$ saturated aliphatic carboxylic acid or a salt or ester thereof, said device being formed from a mixture of said synthetic resin, naled, finely divided silica particles, $C_{14}$ to $C_{20}$ aliphatic saturated carboxylic acid or salt or ester thereof and a surface porosity control component that is non-reactive in the mixture and has a boiling point at or below the curing temperature to produce surface openings in communication with pores in said body by vaporization of said porosity control component to provide for release of naled gas at a rate effective to control insects in the vicinity of said body, but insufficient to form as spew on the body.

2. The device of claim 1 wherein the silica particles are present in an amount of from about 10 to about 35 weight percent of said device and said acid is present in an amount of from about 0.25 to about 3 weight percent of said device.

3. The shaped body of claim 2 wherein said synthetic resinous matrix material is a polyvinyl chloride.

4. The shaped body of claim 1 wherein said mixture contains a minor amount of a surface porosity control component having a boiling point of from about 170° F. up to the curing temperature of the polyvinyl chloride synthetic resinous material.

5. The shaped body of claim 4 wherein said surface porosity control component is selected from the group consisting of chloroacetaldehyde, dichloroacetaldehyde, chloral, bromoacetaldehyde, dibromoacetaldehyde, bromal, bromodichloroacetaldehyde, chlorodibromoacetaldehyde, bromochloroacetaldehyde, 2-bromopropanol and mixtures thereof.

6. The device of claim 1 wherein said shaped body has a regular symmetrical matrix of cavities which extend entirely through one dimension of said body, said cavities having substantially parallel axes and walls that define an essentially straight line along the said one dimension.

7. A device for combatting insects, said device comprising:
a discrete body of flexible synthetic resin material containing between about 20 and 30 weight percent naled and a spew retarding amount of from about 15 to about 25 weight percent of finely divided silica particles and from about 0.5 to about 1.5 weight percent of at least one $C_{14}$ to $C_{20}$ saturated aliphatic carboxylic acid or a salt or ester thereof; said discrete body being formed from a mixture of said synthetic resin, naled, finely divided silica particles and from about 1 to about 3 weight percent of a surface porosity control component that is non-reactive in the mixture and has a boiling point at or below the curing temperature of said resin, said mixture being heated to its curing temperature to produce surface openings in communication with pores in said body by vaporization of said porosity control component to provide for release of naled gas at a rate effective to control insects in the vicinity of said body, but insufficient to form as droplets on the body.

8. The insect control body of claim 7 wherein the synthetic resin is a polyvinyl chloride resin, the finely divided silica particles are minus 200 mesh with 90% of the particles having a size less than 75 microns, the $C_{14}$ to $C_{20}$ saturated aliphatic carboxylic acid is palmitic or stearic acid, the polyvinyl chloride resin is formed into said body from a liquid plastisol dispersion including said surface porosity control component by filling a casting mold pre-heated to a temperature of about 290° F., which is thereafter increased to about 360° F., and which is thereafter cooled and removed from said mold.

9. A method of controlling insects which comprises:
providing a discrete body comprising a mixture of a synthetic resin, from between about 15 to 35% by weight of said strip of naled and a spew retarding amount of finely divided silica particles and at least one $C_{14}$ to $C_{20}$ saturated aliphatic carboxylic acid or a salt or ester thereof;
said body being formed from a mixture of said synthetic resin, naled, silica particles, saturated aliphatic carboxylic acid and a minor amount of a surface porosity control agent that is non-reactive in the mixture and has a boiling point at or below the curing temperature of said mixture, which mixture is formed into said body at the curing temperature to vaporize said control agent and produce surface porosity in said body to provide for release of naled at a rate to effectively control insects in the vicinity of said body but insufficient to form as droplets on the body; and
placing and maintaining said body in an area in which said insects are to be controlled.

10. The method of claim 9 wherein said mixture is formed into said body from a liquid plastisol dispersion containing polyvinyl chloride by filling a casting mold preheated to a temperature of about 290° F., increasing the mold temperature to about 360° F. in a hot air, radiant heated oven for about two minutes, and thereafter cooling and removing the body from said mold.

11. The method of claim 9 wherein said mixture is formed into said body by injection molding of said mixture.

* * * * *